United States Patent
Feng et al.

(10) Patent No.: US 9,889,630 B2
(45) Date of Patent: Feb. 13, 2018

(54) POLISHING EQUIPMENT HAVING DISCONTINUOUS ADHESION POINTS AND METHOD FOR MAKING THE SHEET

(75) Inventors: Chung-Chih Feng, Kaohsiung (TW); I-Peng Yao, Kaohsiung (TW); Lyang-Gung Wang, Kaohsiung (TW); Wen-Chieh Wu, Kaohsiung (TW)

(73) Assignee: BESTAC ADVANCED MATERIAL CO., LTD., Taoyuan County (TW)

( * ) Notice: Subject to any disclaimer, the term of this patent is extended or adjusted under 35 U.S.C. 154(b) by 415 days.

(21) Appl. No.: 12/536,277

(22) Filed: Aug. 5, 2009

(65) Prior Publication Data
US 2010/0227118 A1 Sep. 9, 2010

(30) Foreign Application Priority Data
Mar. 6, 2009 (TW) .............................. 98107478 A

(51) Int. Cl.
B32B 7/14 (2006.01)
B32B 27/40 (2006.01)
B32B 27/34 (2006.01)
B32B 27/32 (2006.01)
B32B 27/30 (2006.01)
B32B 27/06 (2006.01)
B24B 37/30 (2012.01)
B32B 37/12 (2006.01)

(52) U.S. Cl.
CPC ................ *B32B 7/14* (2013.01); *B24B 37/30* (2013.01); *B32B 27/065* (2013.01); *B32B 27/302* (2013.01); *B32B 27/304* (2013.01); *B32B 27/306* (2013.01); *B32B 27/32* (2013.01); *B32B 27/34* (2013.01); *B32B 27/40* (2013.01); *B32B 37/1292* (2013.01); *B32B 2266/025* (2013.01); *B32B 2266/0221* (2013.01); *B32B 2266/0228* (2013.01); *B32B 2266/0235* (2013.01); *B32B 2266/0257* (2013.01); *B32B 2266/0278* (2013.01); *B32B 2429/00* (2013.01); *B32B 2457/00* (2013.01); *B32B 2457/08* (2013.01); *B32B 2457/202* (2013.01); *B32B 2551/00* (2013.01); *Y10T 428/24355* (2015.01); *Y10T 428/24562* (2015.01)

(58) Field of Classification Search
CPC .......... B24B 37/22; B24B 37/27; B24B 37/30
USPC ................................ 428/42.1, 141, 201, 354
See application file for complete search history.

(56) References Cited

U.S. PATENT DOCUMENTS

| 4,889,234 | A | * | 12/1989 | Sorensen et al. | .......... 206/459.5 |
| 6,761,969 | B2 | * | 7/2004 | Li et al. | ......................... 428/354 |
| 6,818,292 | B2 | * | 11/2004 | Hamilton et al. | ............ 428/343 |
| 2002/0161102 | A1 | * | 10/2002 | Benton et al. | ................ 524/502 |

FOREIGN PATENT DOCUMENTS

| CN | 101298129 | 11/2008 |
| JP | 3476685 | 12/2003 |
| TW | 220002 | 2/1994 |
| TW | 200833805 A | 8/2008 |
| TW | 200842962 | 11/2008 |

OTHER PUBLICATIONS

Chinese Office Action dated Apr. 27, 2011 for 200910134478.2, which is a corresponding Chinese application, that cites CN 101298129A, JP 3476685B2, and TW 220002A.
Office Action by TIPO for counterpart TW application No. 098107478 dated Jun. 29, 2012 cites TW 200833805.
English abstract of Office Action by TIPO for counterpart TW application No. 098107478 dated Jun. 29, 2012.
English abstract of TW 200833805.

* cited by examiner

*Primary Examiner* — Sheeba Ahmed
(74) *Attorney, Agent, or Firm* — WPAT, P.C., Intellectual Property Attorneys; Anthony King

(57) ABSTRACT

The sheet of a polishing equipment of the present invention includes a buffer layer, an adsorption layer, and an adhesion layer. The adhesion layer is disposed between the buffer layer and the adsorption layer. The adhesion layer has a plurality of adhesion points to bind the buffer layer and the adsorption layer together. The adhesion points are discontinuous and have gaps in between. Consequently, when the sheet is pressed, air can be vented out through the gaps between the adhesion points, so that the adsorption force is increased.

5 Claims, 8 Drawing Sheets

POLISHING EQUIPMENT HAVING DISCONTINUOUS ADHESION POINTS AND METHOD FOR MAKING THE SHEET

BACKGROUND OF THE INVENTION

1. Field of the Invention

The present invention relates to a sheet of a polishing equipment and a method for making the same, and particularly to a sheet having discontinuous adhesion points and a method for making the same.

2. Description of the Related Art

Polishing generally refers to abrasion control of a rough surface in a chemical mechanical polishing (CMP) process. The polishing is performed by uniformly dispersing a slurry with fine particles on an upper surface of a polishing pad, and meanwhile repeatedly and regularly grinding a polishing workpiece held against the polishing pad. The polishing workpiece is an object such as a semiconductor, a storage media substrate, an integrated circuit (IC), an LCD flat glass, an optical glass, or a photoelectric panel. During the polishing process, a sheet is required to adsorb and fix the polishing workpiece, and thus the quality of the sheet may directly influence the polishing effect of the polishing workpiece.

FIG. 1 shows a schematic view of a type of polishing equipment having a conventional sheet. The polishing equipment 1 includes a pressure plate 11, a sheet 12, a polishing workpiece 13, a polishing plate 14, a polishing pad 15, and a slurry 16. The pressure plate 11 is opposite to the polishing plate 14. The sheet 12 is adhered onto the pressure plate 11 through a back-adhesive layer (not shown), and is used to adsorb and fix the polishing workpiece 13. The polishing pad 15 is fixed at the polishing plate 14 and faces the pressure plate 11, so as to perform polishing on the polishing workpiece 13.

The polishing equipment 1 operates as follows. First, the polishing workpiece 13 is placed on the sheet 12, and adsorbed by the sheet 12. Next, the polishing plate 14 and the pressure plate 11 rotate in opposite directions, and meanwhile the pressure plate 11 moves downward, such that the polishing pad 15 is in contact with a surface of the polishing workpiece 13. The slurry 16 is continuously supplied and the polishing pad 15 is employed to perform polishing on the polishing workpiece 13.

FIG. 2 shows a schematic enlarged view of the sheet in FIG. 1. The sheet 12 includes a buffer layer 121, an adsorption layer 122, and an adhesion layer 123. The buffer layer 121 is made of polyurethane (PU) resin and has a plurality of communicating pores. The adsorption layer 122 is also made of PU resin and is disposed on the buffer layer 121 to adsorb the polishing workpiece 13 (as shown in FIG. 1). The adhesion layer 123 is disposed between the buffer layer 121 and the adsorption layer 122. The adhesion layer 123 is made of a paste (for example, one-component PU resin) and completely fills the space between the adsorption layer 122 and the buffer layer 121, such that the adsorption layer 122 is adhered onto the buffer layer 121.

A disadvantage of the conventional sheet 12 is as follows. As the amount of the paste used to form the adhesion layer 123 may influence the adsorption force of the sheet 12, in the conventional sheet 12, the paste of the adhesion layer 123 completely fills the space between the adsorption layer 122 and the buffer layer 121, and thus the adsorption force of the sheet 12 is decreased. Consequently, water leakage may easily occur around the polishing workpiece 13 and the sheet 12 during the polishing process, so that the service life of the sheet 12 is shortened.

Therefore, it is necessary to provide a sheet having discontinuous adhesion points and a method for making the same to solve the above problems.

SUMMARY OF THE INVENTION

The present invention is directed to a sheet of a polishing equipment having discontinuous adhesion points. The sheet includes a buffer layer, an adsorption layer, and an adhesion layer. The buffer layer is made of polymer and has a plurality of communicating pores. The adsorption layer is made of polymer and is disposed on the buffer layer to adsorb a workpiece. The adhesion layer is disposed between the buffer layer and the adsorption layer. The adhesion layer has a plurality of adhesion points to bind the buffer layer and the adsorption layer. The adhesion points are discontinuous and have gaps in between.

The present invention is further directed to a method for making a sheet. The method includes the following steps: (a) providing a buffer layer made of e polymer and has a plurality of communicating pores; (b) providing an adsorption layer made of a polymer; (c) forming an adhesion layer on the buffer layer, in which the adhesion layer includes a plurality of adhesion points, and the adhesion points are discontinuous and have gaps in between; and (d) binding the adsorption layer with the buffer layer to form a sheet, in which the buffer layer and the adsorption layer are bound together through the adhesion points, and the adhesion points are discontinuous and have gaps in between.

In the present invention, a plurality of discontinuous adhesion points is provided between the buffer layer and the adsorption layer. Consequently, when the sheet is subjected to a perpendicular force, the buffer layer and the adsorption layer are pressed. Meanwhile, air between the buffer layer and the adsorption layer can not only be vented out in a perpendicular direction, but also vented out in a horizontal direction, thus resulting in a suction effect and increasing the adsorption force.

DETAILED DESCRIPTION OF THE INVENTION

Figure 1:
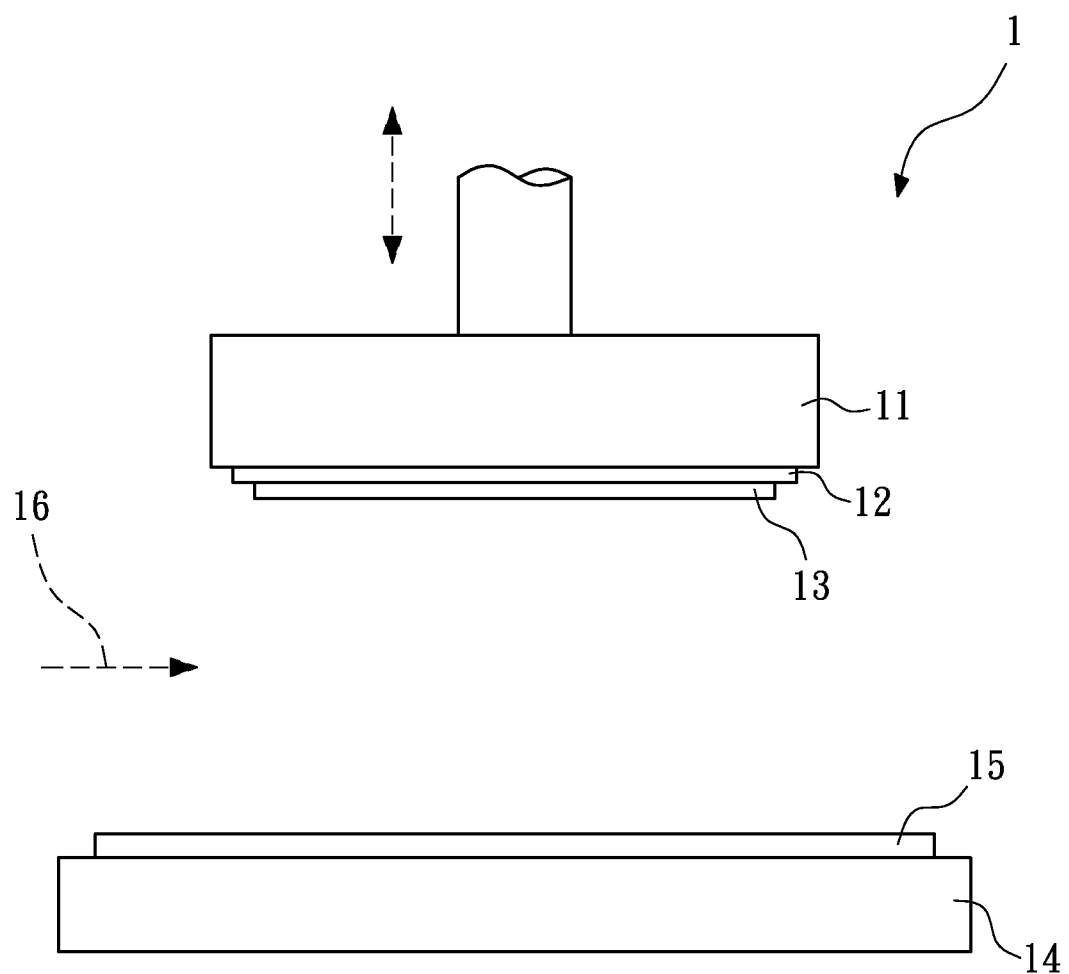
FIG. 1 is a schematic view of a type of polishing equipment having a conventional sheet.
Figure 2:
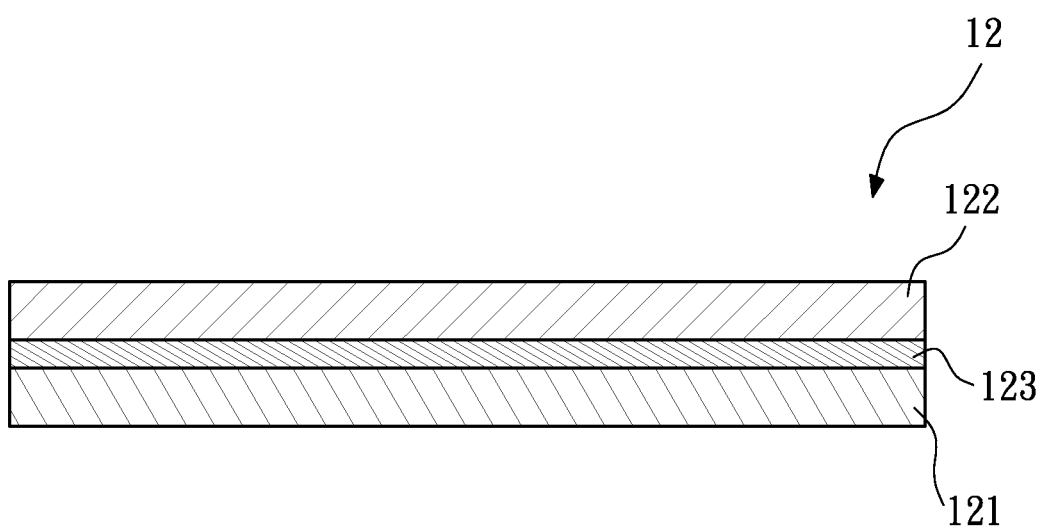
FIG. 2 is a schematic enlarged view of the sheet in FIG. 1.
Figure 3:
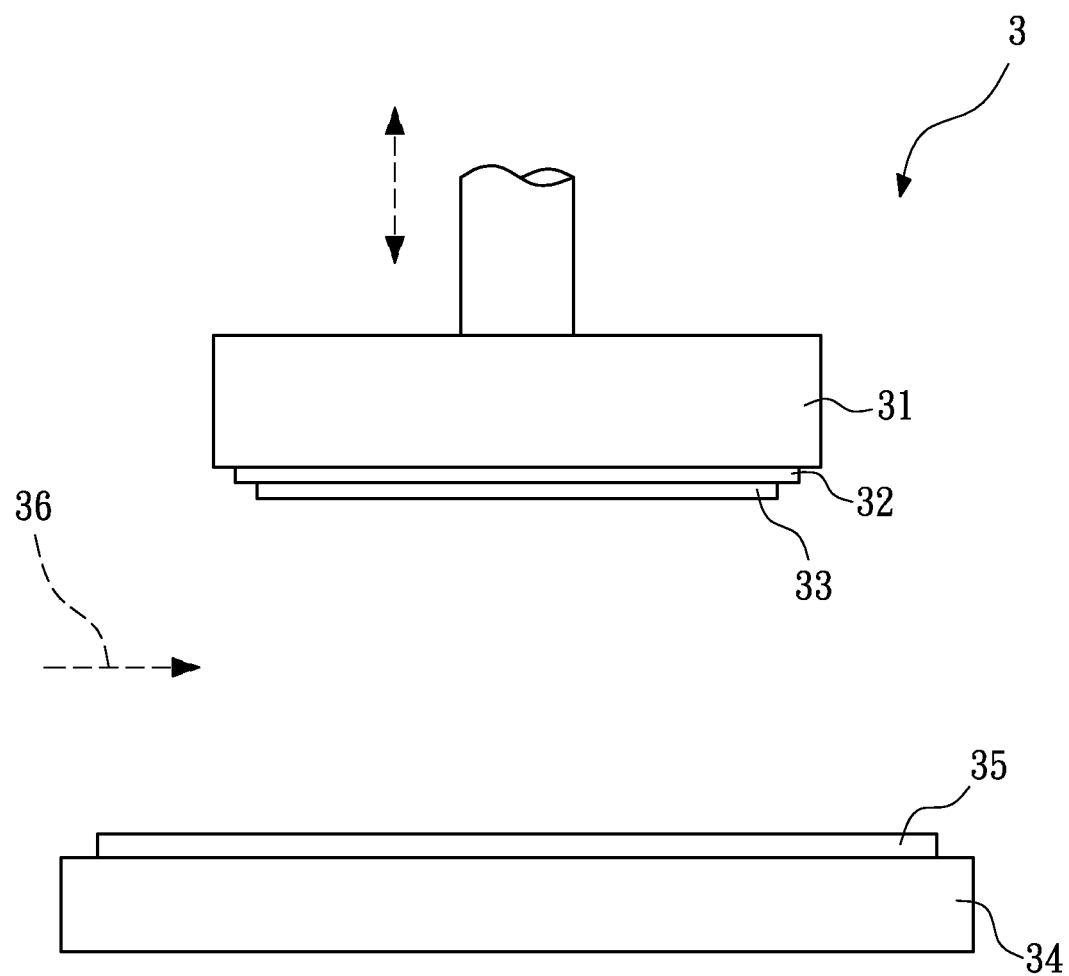
FIG. 3 is a schematic view of a type of polishing equipment having a sheet according to the present invention.

FIG. 3 shows a schematic view of a type of polishing equipment having a sheet according to the present invention.

The polishing equipment 3 includes a pressure plate 31, a sheet 32, a polishing workpiece 33, a polishing plate 34, a polishing pad 35, and a slurry 36. The pressure plate 31 is opposite to the polishing plate 34. The sheet 32 is adhered onto the pressure plate 31 through a back-adhesive layer (not shown), and is used to adsorb and fix the polishing workpiece 33 to be polished during a polishing process. The polishing workpiece 33 to be polished is selected from a group consisting of a semiconductor, a storage media substrate, an IC, an LCD flat glass, an optical glass, and a photoelectric panel. The polishing pad 35 is fixed at the polishing plate 34 and faces the pressure plate 31, so as to perform polishing on the polishing workpiece 33.

The polishing equipment 3 operates as follows. First, the polishing workpiece 33 is placed onto the sheet 32, and adsorbed by the sheet 32. Next, the polishing plate 34 and the pressure plate 31 rotate in opposite directions, and meanwhile the pressure plate 31 moves downward, such that the polishing pad 35 is in contact with a surface of the polishing workpiece 33. The slurry 36 is continuously supplied and the polishing pad 35 is employed to perform polishing on the polishing workpiece 33.

Figure 4:
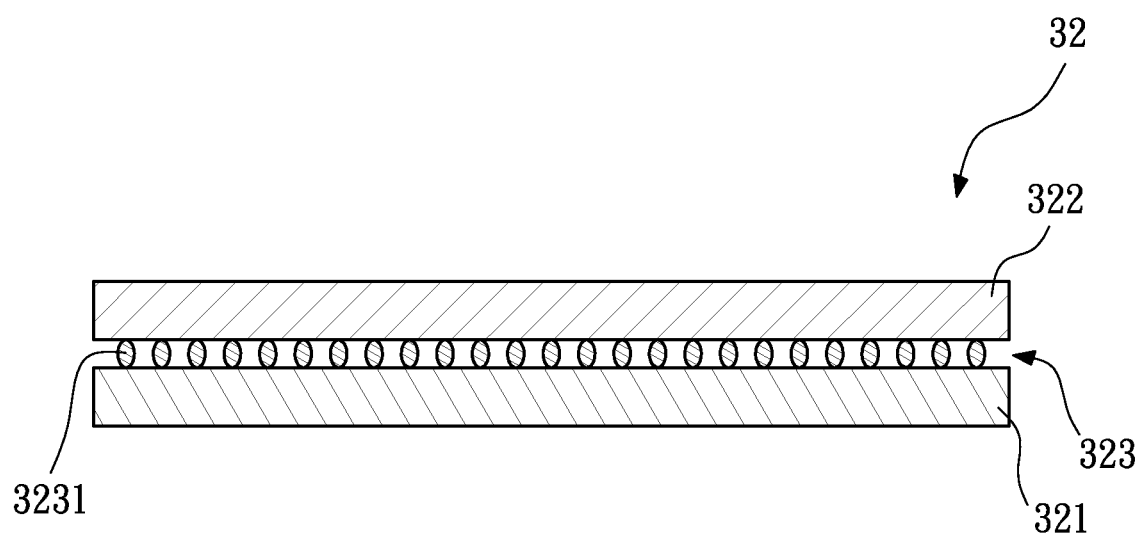
FIG. 4 is a schematic enlarged view of the sheet in FIG. 3.
Figure 4A:
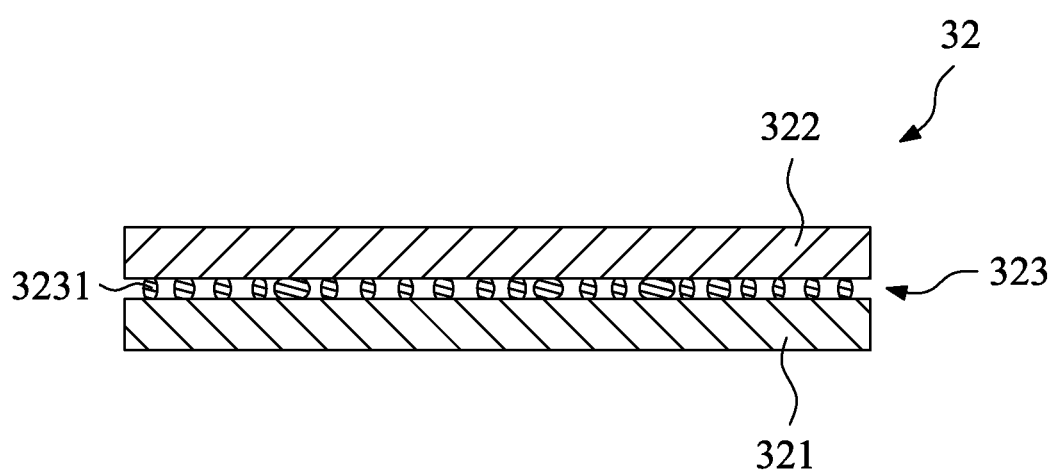

FIG. 4 shows a schematic enlarged view of the sheet in FIG. 3. The sheet 32 includes a buffer layer 321, an adsorption layer 322, and an adhesion layer 323. The sheet 32 is a three-layered structure. The buffer layer 321 is made of polymer, such as PU resin, polyvinyl chloride (PVC) resin, polystyrene (PS) resin, polyethylene (PE) resin, polyamide (PA) resin, polypropylene (PP) resin, or ethylene vinyl acetate (EVA) resin. The buffer layer 321 has a plurality of communicating pores.

The adsorption layer 322 is made of polymer, such as PU resin, PVC resin, PS resin, PE resin, PA resin, PP resin, or EVA resin. The adsorption layer 322 is disposed on the buffer layer 321 to adsorb the polishing workpiece 33 to be polished during a polishing process. The adsorption layer 322 and the buffer layer 321 are parallel to each other. The adsorption layer 322 is different from the buffer layer 321. Preferably, the buffer layer 321 has a compression ratio greater than that of the adsorption layer 322, and the buffer layer 321 has a void content higher than that of the adsorption layer 322.

The adhesion layer 323 is disposed between the buffer layer 321 and the adsorption layer 322. The adhesion layer 323 is a paste layer made of pressure sensitive adhesives (PSA), moisture-cured PU resin, one-component PU resin or two-component PU resin. The adhesion layer 323 has a plurality of adhesion points 3231 to bind the buffer layer 321 and the adsorption layer 322 together. The adhesion points 3231 are discontinuous and have gaps in between. That is, the adhesion layer 323 is not completely filled between the buffer layer 321 and the adsorption layer 322. In this embodiment, the adhesion points 3231 are regularly distributed, that is, the adhesion points 3231 are of the same size and the gaps between the adhesion points 3231 are of the same size. The sheet 32 has an adsorption force greater than 2.0 kg/12.25 cm$^2$.

Figure 5:
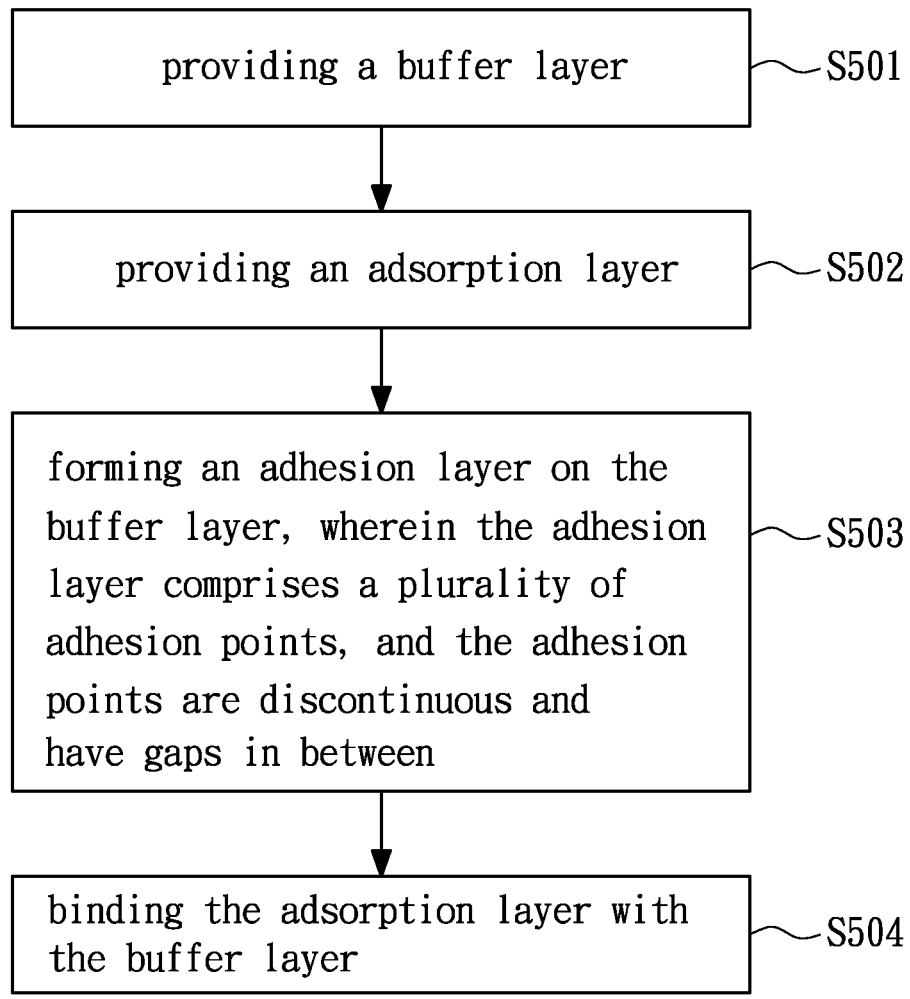
FIG. 5 is a schematic flow chart of a method for making a sheet according to the present invention.

FIG. 5 shows a schematic flow chart of a method for making a sheet according to the present invention. The method includes the following steps. First, in Step S501, a buffer layer 321 is provided. The buffer layer 321 is made of polymer and has a plurality of communicating pores. A method for making the buffer layer 321 is as follows. First, a first resin layer is wet-coated onto a support (for example, a release cloth). The first resin layer is made of PU resin, PVC resin, PS resin, PE resin, PA resin, PP resin, or EVA resin. Next, the first resin layer is solidified. Then, the first resin layer is washed. Finally, the first resin layer is dried to form the buffer layer 321.

Next, in Step S502, an adsorption layer 322 is provided. The adsorption layer 322 is made of polymer. A method for making the adsorption layer 322 is as follows. First, a second resin layer is wet-coated onto a second support (for example, a release cloth). The second resin layer is made of PU resin, PVC resin, PS resin, PE resin, PA resin, PP resin, or EVA resin. Next, the second resin layer is solidified. Then, the second resin layer is washed. Finally, the second resin layer is dried to form the adsorption layer 322.

Figure 6:
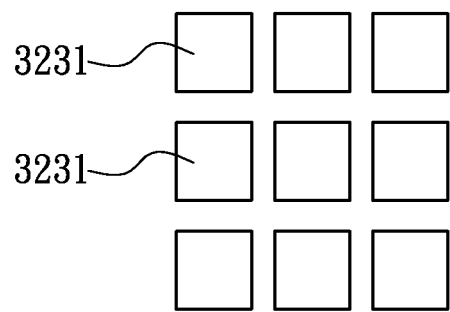
FIG. 6 is a schematic enlarged top view of forming an adhesion layer on a buffer layer according to the present invention, in which the adhesion points are in the form of quadrilaterals.
Figure 7:
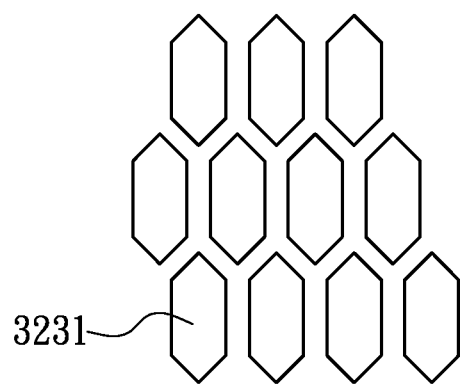
FIG. 7 is a schematic enlarged top view of forming the adhesion layer on the buffer layer according to the present invention, in which the adhesion points are in the form of hexagons.
Figure 8:
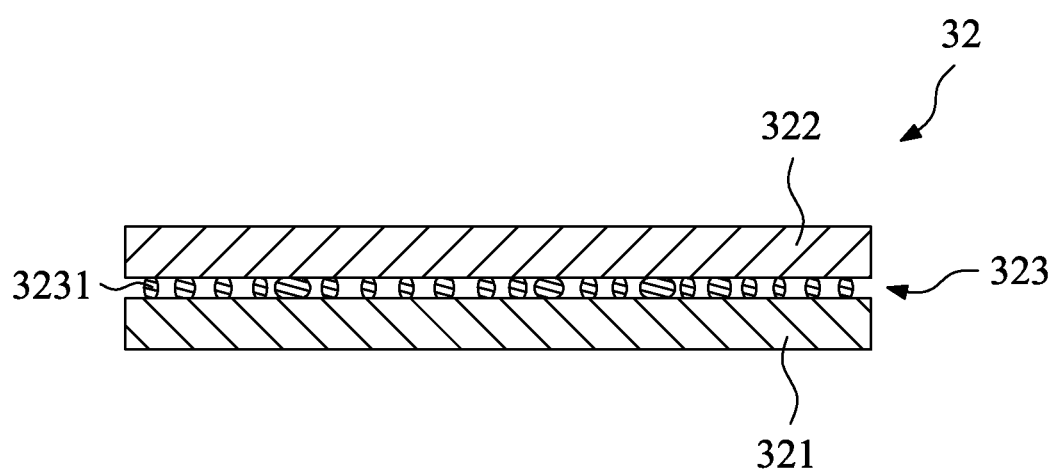
FIG. 8 is a schematic view of another example of FIG. 4.

Afterward, in Step S503, an adhesion layer 323 is formed on the buffer layer 321. The adhesion layer 323 includes a plurality of adhesion points 3231. The adhesion points 3231 are discontinuous and have gaps in between. The adhesion layer 323 is a paste layer made of PSA, moisture-cured PU resin, one-component PU resin, or two-component PU resin. The adhesion layer 323 is not completely coated onto the buffer layer 321. Instead, a plurality of adhesion points 3231 is formed on the buffer layer 321 by using an adhesion tool such as a print wheel or a transcription tool. The adhesion points 3231 are regularly or irregularly distributed. Preferably, the gaps between the adhesion points 3231 are of the same size. The adhesion points 3231 may be in the form of dots, circles, ellipses, irregular shapes, triangles, quadrilaterals (as shown in the schematic enlarged top view of FIG. 6), pentagons, or hexagons (as shown in the schematic enlarged top view of FIG. 7), and the like.

Finally, in Step S504, the adsorption layer 322 is adhered onto the buffer layer 321. Then, a sheet 32 is formed after the adsorption layer 322 is cured by one-day standing. In the sheet 32, the buffer layer 321 and the adsorption layer 322 are adhered through the adhesion points 3231. The adhesion points 3231 are discontinuous and have gaps in between. That is, after the adhering process in Step S504, the adhesion points 3231 still substantially keep the shape and distribution in Step S503, instead of completely filling the space between the buffer layer 321 and the adsorption layer 322.

The present invention is further illustrated in detail below with an example. However, the present invention is not limited to the content of this example.

EXAMPLE

Firstly, a first support is provided as a coating substrate. The first support is a release cloth. A coating material is prepared by uniformly mixing 19.9 wt % of PU resin for coating, 6.6 wt % of pigment, 2.5 wt % of interfacial agent, and 71 wt % of dimethylformamide (DMF) solvent. Next, the coating material is coated onto the first support to form a first resin layer. Then, the first resin layer is solidified. Exchange solidification is performed on the first resin layer with the DMF at a concentration of 6% to 15% in a solidification bath. Afterward, the first resin layer is washed at a temperature of 40 to 80° C. Finally, the first resin layer is dried at 60 to 150° C. to form a communicating porous buffer layer.

Next, a second support is provided as a coating substrate. The second support is a release cloth. A coating material is prepared by uniformly mixing 37.7 wt % of PU resin for coating, 1.1 wt % of pigment, 23.5 wt % of interfacial agent, and 37.7 wt % of DMF solvent. Then, the coating material is coated onto the second support to form a second resin layer. The second resin layer is solidified. Exchange solidification is performed on the second resin layer with the DMF at a concentration of 6 to 15% in the solidification bath.

Afterward, the second resin layer is washed at a temperature of 70° C. Finally, the second resin layer is dried at 130° C. to form an adsorption layer.

Thereafter, gravure printing is performed on the moisture-cured PU resin to form a plurality of adhesion points on the buffer layer. The adhesion points are discontinuous and have gaps in between. The adhesion points are regularly distributed, and are in the form of quadrilaterals (as shown in the schematic enlarged top view of FIG. 6).

Finally, the adsorption layer is adhered onto the buffer layer, and a sheet is formed after the adsorption layer is cured by one-day standing. The sheet has an adsorption force of 3.0 to 3.5 kg/12.25 cm$^2$, a hardness of 16 Shore A, a compression ratio of 51.00%, and a compression-recovery ratio of 96.08%. And a conventional sheet usually has an adsorption force of about 1.5 to 2.0 kg/12.25 cm$^2$.

In the present invention, taking FIG. 4 as an example, a plurality of discontinuous adhesion points 3231 is provided between the buffer layer 321 and the adsorption layer 322. Therefore, when the sheet 32 is subjected to a perpendicular force in the figure (for example, the polishing workpiece 33 is placed on the sheet 32), the buffer layer 321 and the adsorption layer 322 are pressed. Meanwhile, air between the buffer layer 321 and the adsorption layer 322 can not only be vented out in a perpendicular direction (through the adsorption layer 322), but also vented out in a horizontal direction (through the gaps between the adhesion points 3231), thus resulting in a suction effect and increasing the adsorption force of the adsorption layer 322 to the polishing workpiece 33.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A sheet used to adsorb a workpiece to be polished during a polishing process, comprising:
    a buffer layer made of a polymer and having a plurality of communicating pores, wherein a material of the buffer layer is selected from a group consisting of polyurethane (PU) resin, polyvinyl chloride (PVC) resin, polystyrene (PS) resin, polyethylene (PE) resin, polyamide (PA) resin, polypropylene (PP) resin, and ethylene vinyl acetate (EVA) resin;
    an adsorption layer made of a polymer and disposed on the buffer layer, wherein the adsorption layer has a plurality of openings on an adsorption surface thereof to adsorb the workpiece to be polished during the polishing process, wherein the buffer layer has a compression ratio greater than that of the adsorption layer, and the buffer layer has a void content higher than that of the adsorption layer, wherein a material of the adsorption layer is selected from a group consisting of PU resin, PVC resin, PS resin, PE resin, PA resin, PP resin, and EVA resin; and
    an adhesion layer, disposed between and completely separating the buffer layer and the adsorption layer, which has a plurality of adhesion points to bind the buffer layer and the adsorption layer, and the adhesion points are discontinuous and have gaps in between; wherein air between the buffer layer and the adsorption layer is vented out in a perpendicular direction perpendicular to the adsorption surface through the adsorption layer and is vented out in a horizontal direction parallel with the adsorption surface through the gaps between the adhesion points when the workpiece is placed on the sheet, so as to increase a adsorption force of the adsorption layer to the workpiece with a suction effect, wherein the adhesion points are in the form of ellipses, irregular shapes, triangles, quadrilaterals, pentagons, or hexagons, wherein the adhesion layer is a paste layer selected from a group consisting of pressure sensitive adhesives (PSA), moisture-cured PU resin, one-component PU resin, and two-component PU resin.

2. The sheet according to claim 1, wherein the gaps between the adhesion points are of the same size.

3. The sheet according to claim 1, wherein the adhesion points are regularly distributed.

4. The sheet according to claim 1, wherein the adhesion points are irregularly distributed.

5. The sheet according to claim 1, wherein the sheet has an adsorption force greater than 2.0 kg/12.25 cm$^2$.

\* \* \* \* \*